United States Patent
Kaneko et al.

(10) Patent No.: US 9,939,314 B2
(45) Date of Patent: Apr. 10, 2018

(54) SHOCK RECORDING DEVICE

(71) Applicant: Panasonic Intellectual Property Management Co., Ltd., Osaka (JP)

(72) Inventors: Yukihiro Kaneko, Osaka (JP); Michihito Ueda, Kyoto (JP); Yu Nishitani, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 472 days.

(21) Appl. No.: 14/623,081

(22) Filed: Feb. 16, 2015

(65) Prior Publication Data

US 2015/0241464 A1 Aug. 27, 2015

(30) Foreign Application Priority Data

Feb. 25, 2014 (JP) .................. 2014-033910

(51) Int. Cl.
*G01H 11/06* (2006.01)
*G01H 11/08* (2006.01)
(Continued)

(52) U.S. Cl.
CPC ............ *G01H 11/06* (2013.01); *G01L 5/0052* (2013.01); *G01P 1/127* (2013.01); *G01P 15/036* (2013.01)

(58) Field of Classification Search
CPC ...... G01H 11/06; G01H 11/08; G01L 5/0052; G01P 1/127; G01P 1/12; G01P 15/036; G01P 15/00; G01P 15/02; G01P 15/03; G01P 15/032; G01P 15/08; G01P 15/09; G01P 15/0907

(Continued)

(56) References Cited

U.S. PATENT DOCUMENTS 6,864,790 B2 3/2005 Nishihara et al.
9,435,704 B2 * 9/2016 Ueda .................. G01L 5/0052
(Continued)

FOREIGN PATENT DOCUMENTS

| JP | 2002-243754 | 8/2002 |
| JP | 2004-061347 | 2/2004 |
| JP | 2013-096931 | 5/2013 |

*Primary Examiner* — Manish S Shah
*Assistant Examiner* — Rose M Miller
(74) *Attorney, Agent, or Firm* — McDermott Will & Emery LLP

(57) ABSTRACT

The present invention provides a shock recording device includes: an electric power source; a vibration energy harvester including a first electrode and a second electrode, the vibration energy harvester converting an energy of a shock applied thereto into a potential difference between the first electrode and the second electrode; a first transistor including a first gate electrode, a first source electrode, and a first drain electrode, the first transistor further including a stacked structure of a ferroelectric layer and a semiconductor layer; and a second transistor including a second gate electrode, a second source electrode, and a second drain electrode. The second gate electrode is electrically connected to the first electrode. The second drain electrode is electrically connected to the electric power source. The second source electrode is electrically connected to the first gate electrode. The first source electrode is electrically connected to the second electrode.

6 Claims, 15 Drawing Sheets

(51) Int. Cl.
    *G01L 5/00*         (2006.01)
    *G01P 1/12*         (2006.01)
    *G01P 15/03*       (2006.01)

(58) Field of Classification Search
    USPC .......................................... 73/654, 652, 651
    See application file for complete search history.

(56) References Cited

U.S. PATENT DOCUMENTS

| | | | |
|---|---|---|---|
| 9,500,547 B1* | 11/2016 | Ueda | G01L 5/0052 |
| 2014/0021825 A1* | 1/2014 | Ocalan | H02N 11/002 |
| | | | 310/300 |
| 2015/0160071 A1* | 6/2015 | Kadosawa | G01H 11/08 |
| | | | 73/658 |

\* cited by examiner

--- Prior Art ---

# SHOCK RECORDING DEVICE

BACKGROUND

1. Technical Field

The present invention relates to a shock recording device for recording an external shock.

2. Description of the Related Art

Japanese Patent Application laid-open Publication No. 2002-243754A discloses an electronic apparatus and an impact detecting method for detecting an impact exerted thereon. FIG. 14 shows a block diagram of the electronic apparatus disclosed in Japanese Patent Application laid-open Publication No. 2002-243754A. As shown in FIG. 14, the electronic apparatus disclosed therein comprises a CPU 921, loads 92-95, a power supply 931, a memory 922, an external connection terminal 97, a shock detector 99, and an alarm 923. A measuring instrument 924 may be connected to the external connection terminal 97.

FIG. 15 shows a circuit diagram of the shock detector 99 included in the electronic apparatus disclosed in Japanese Patent Application laid-open Publication No. 2002-243754A. As shown in FIG. 15, the shock detector 99 disclosed therein comprises a shock detecting element 911, a FET 912, a resistance 913, a power supply terminal 918, a resistance 919, and an output terminal 920. When a shock is applied to the shock detector 99, a voltage is applied to the gate electrode of the FET 912. In this way, the FET 912 is turned on and an electric current flows from the power supply terminal 918 to the output terminal 920. This electric current is recorded as a shock detection signal in the memory 922 through the CPU 921.

SUMMARY

The present invention provides a shock recording device consisting of:

an electric power source;

a vibration energy harvester comprising a first electrode and a second electrode, the vibration energy harvester converting an energy of a shock applied thereto into a potential difference between the first electrode and the second electrode;

a first transistor comprising a first gate electrode, a first source electrode, and a first drain electrode, the first transistor further comprising a stacked structure of a ferroelectric layer and a semiconductor layer; and a second transistor comprising a second gate electrode, a second source electrode, and a second drain electrode;

wherein the second gate electrode is electrically connected to the first electrode;

the second drain electrode is electrically connected to the electric power source;

the second source electrode is electrically connected to the first gate electrode; and the first source electrode is electrically connected to the second electrode.

The present invention provides a simply-structured shock recording device.

DETAILED DESCRIPTION OF THE EMBODIMENTS

Hereinafter, the embodiments of the present invention will be described with reference to the drawings.

First Embodiment

Figure 1:
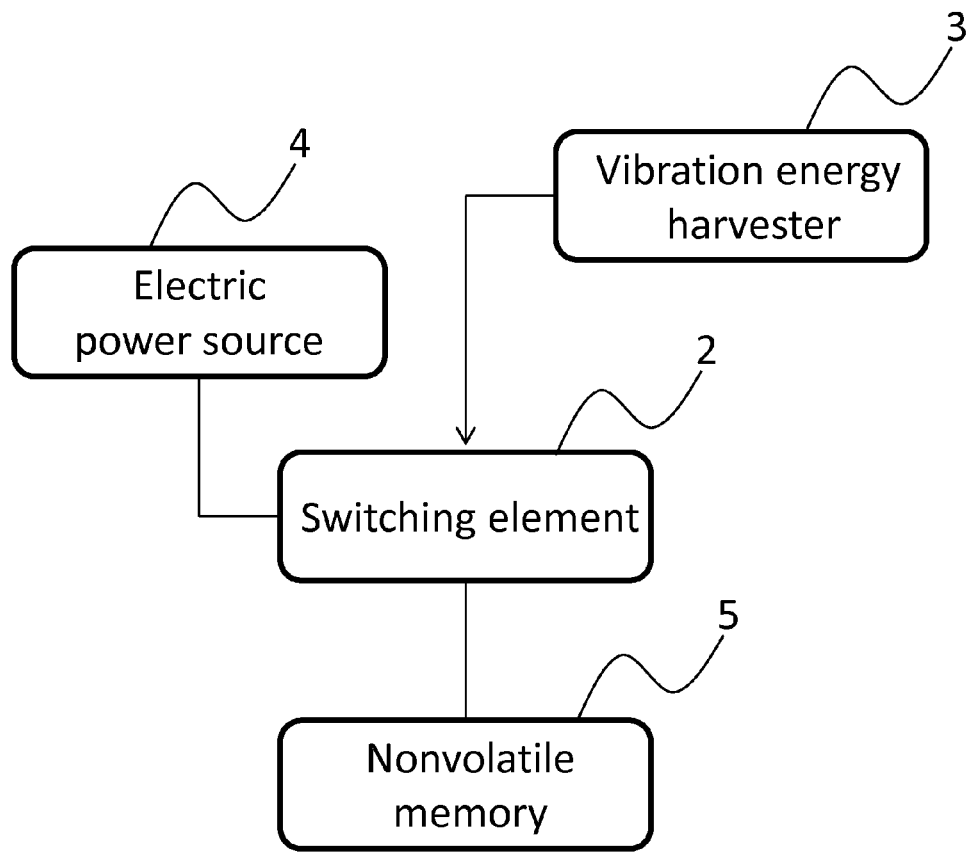
FIG. 1 shows a block diagram indicating a conceptual constitution of a shock recording device 1 according to a first embodiment.

FIG. 1 shows a block diagram indicating a conceptual constitution of a shock recording device 1 according to the first embodiment. As shown in FIG. 1, the shock recording device 1 according to the first embodiment comprises a switching element 2, a vibration energy harvester 3, an electric power source 4, and a nonvolatile memory 5. The vibration energy harvester 3 is configured to generate a voltage when an external shock is applied thereto. The switching element 2 operates based on the voltage generated by the vibration energy harvester 3 to control the connection and disconnection between the electric power source 4 and the nonvolatile memory 5. For example, when a voltage of not less than a predetermined voltage Vs is applied to the switching element 2, the electric power source 4 is electrically connected to the nonvolatile memory 5 through the switching element 2.

On the other hand, when a voltage less than the predetermined voltage Vs is applied to the switching element 2, the electric power source 4 is electrically insulated from the nonvolatile memory 5. The electric power source 4 supplies a predetermined constant voltage Vc. When the electric power source 4 is electrically connected to the nonvolatile memory 5 through the switching element 2, the voltage Vc supplied from the electric power source 4 is applied to the nonvolatile memory 5. When the voltage Vc is applied to the nonvolatile memory 5, the state of the nonvolatile memory 5 is varied depending on the application time of the voltage Vc. In this way, information is recorded in the nonvolatile memory 5.

When an external shock is applied to the shock recording device 1, the vibration energy harvester 3 generates an electric power. If the voltage generated by the vibration energy harvester 3 is not less than the voltage Vs, the state of the switching element 2 is switched to a connection state. In this way, the voltage Vc supplied from the electric power source 4 is applied to the nonvolatile memory 5 to change the state of the nonvolatile memory 5. On the other hand, if the voltage generated by the vibration energy harvester 3 is less than the voltage Vs, the electric power source 4 is not electrically connected to the nonvolatile memory 5. Therefore, the state of the nonvolatile memory 5 remains unchanged.

As just described, if the voltage generated by the vibration energy harvester 3 to which a shock has been applied is more than the voltage Vs, the voltage Vc is applied to the nonvolatile memory 5. In this way, shock information including the presence or absence of the shock and the number of shocks is recorded in the nonvolatile memory 5 appropriately. Furthermore, regardless of whether or not the shock information recorded in the nonvolatile memory 5 is read, the shock recording device 1 is used repeatedly. The voltage Vc supplied from the electric power source 4 is consumed only while the state of the switching element 2 is a connection state. For this reason, the shock recording device 1 has a good power-saving property.

Figure 2:
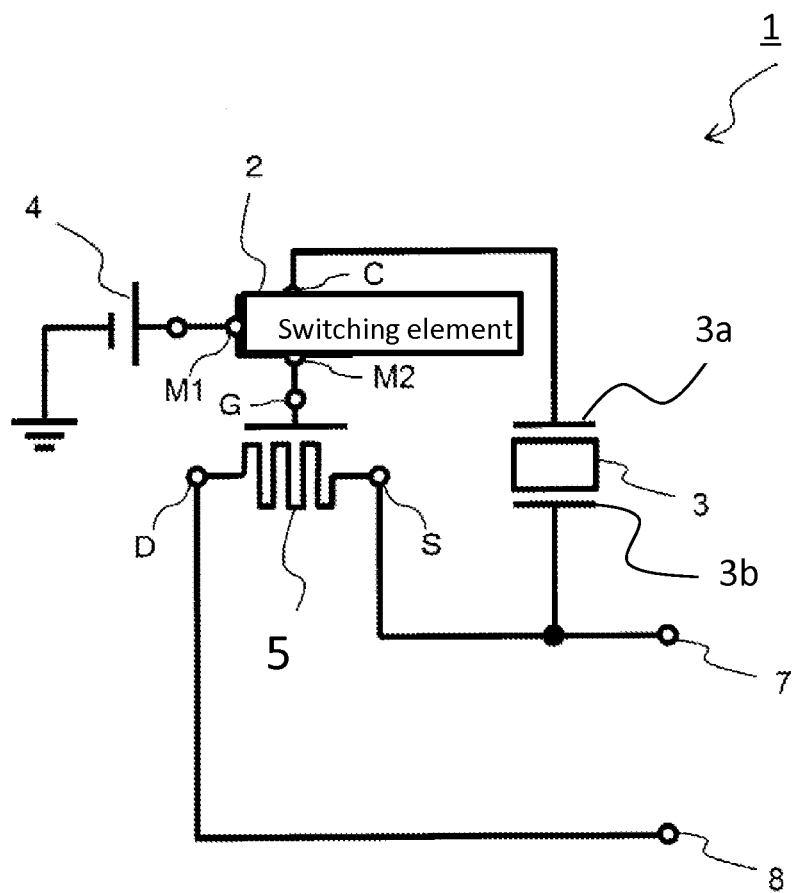
FIG. 2 shows a circuit diagram of the shock recording device 1 according to the first embodiment.

FIG. 2 shows a circuit diagram of the shock recording device 1 according to the first embodiment. As shown in FIG. 2, the shock recording device 1 comprises the switching element 2, the vibration energy harvester 3, the electric power source 4, and the nonvolatile memory 5.

The switching element 2 has a pair of main electrodes and a control electrode C. The pair of the main electrodes is composed of a first main electrode M1 and a second main electrode M2. The nonvolatile memory 5 has three terminals composed of a drain electrode D, a source electrode S, and a gate electrode G. The drain electrode D and the source electrode S serve as a pair of main electrodes. The gate electrode G serves as a control electrode. The vibration energy harvester 3 has a piezoelectric body. The vibration energy harvester 3 generates a voltage between terminals thereof when a voltage is applied to the vibration energy harvester 3. The electric power source 4 supplies the predetermined constant voltage Vc. The first main electrode M1 is electrically connected to the electric power source 4. The second main electrode M2 is electrically connected to the gate electrode G. The vibration energy harvester 3 comprises a first electrode 3a and a second electrode 3b. The control electrode C is electrically connected to the first electrode 3a. The source electrode S is electrically connected to the second electrode 3b. A first terminal 7 and a second terminal 8 are electrically connected to the source electrode S and the drain electrode D, respectively.

Since the drain electrode D and the source electrode S of the nonvolatile memory 5 are functionally equivalent to each other, the drain electrode D may be electrically connected to the second electrode 3b, and the first terminal 7 and the second terminal 8 may be electrically connected to the drain electrode D and the source electrode S, respectively.

For example, the nonvolatile memory 5 is a ferroelectric-gate field-effect transistor (hereinafter, referred to as "ferroelectric transistor"). The ferroelectric transistor has a gate insulation film formed of a ferroelectric material. The ferroelectric memory used for a conventional shock recording device is a ferroelectric capacitor. The ferroelectric capacitor is a passive device which has only a function of consuming the supplied electric power. On the other hand, the ferroelectric transistor is an active device in which the voltage or the electric current is varied depending on the supplied electric power.

In a case where the nonvolatile memory 5 is a ferroelectric transistor, what is necessary to obtain shock information recorded in the nonvolatile memory 5 is only to measure a resistance value between the first terminal 7 and the second terminal 8. On the other hand, in a case where the ferroelectric capacitor is used, the shock information recorded in the nonvolatile memory 5 fails to be obtained by measuring the resistance value of the ferroelectric capacitor. Accordingly, unlike the case where the ferroelectric capacitor is used, in a case where the nonvolatile memory 5 is a ferroelectric transistor, the shock information recorded in the nonvolatile memory 5 can be obtained easily.

Another example of the nonvolatile memory 5 is a nonvolatile memory having three terminals. An example of the nonvolatile memory having three terminals is a flash memory. Still another example of the nonvolatile memory 5 is a nonvolatile memory having two terminals. An example of the nonvolatile memory having two terminals is a resistance random access memory, a phase-change memory, or a magnetic memory.

Hereinafter, the case where the nonvolatile memory 5 is a ferroelectric transistor 5 in the first embodiment will be described in more detail.

(Structure and Action of Ferroelectric Transistor)

Figure 3A:
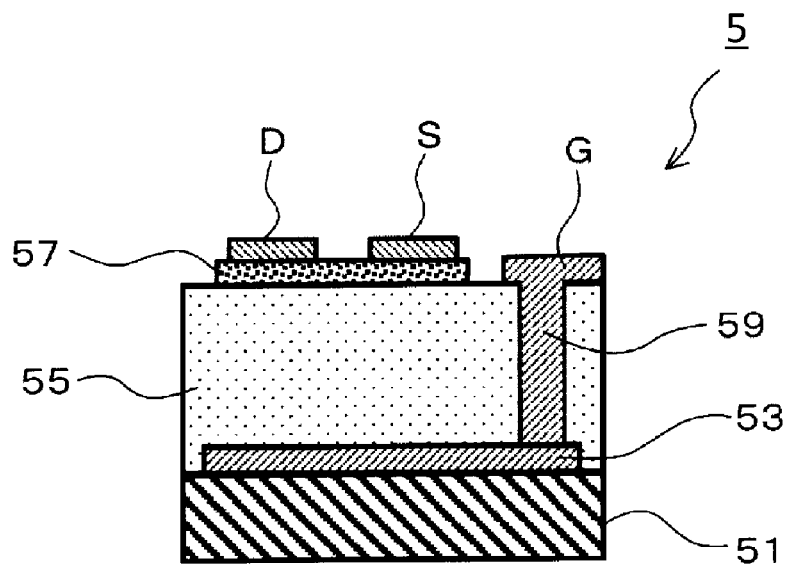
FIG. 3A shows a cross-sectional view of a ferroelectric transistor 5.
Figure 3B:
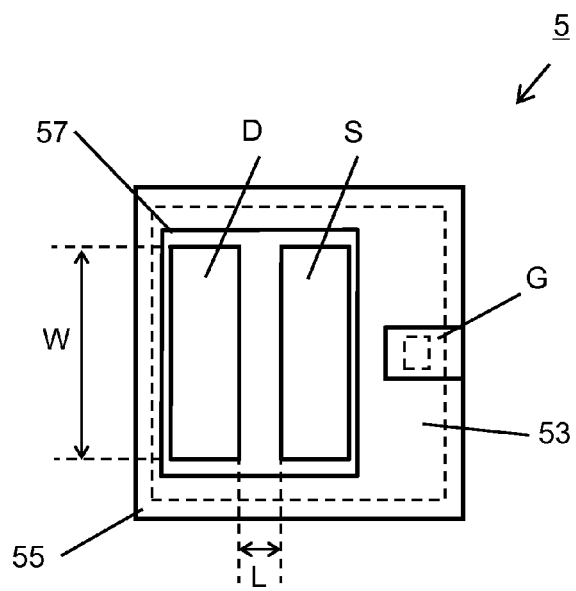
FIG. 3B shows a top view of the ferroelectric transistor 5.

FIG. 3A shows a cross-sectional view of the ferroelectric transistor 5. FIG. 3B shows a top view of the ferroelectric transistor 5.

As shown in FIG. 3A and FIG. 3B, the ferroelectric transistor 5 comprises a substrate 51; an electrode layer 53 formed on the substrate 51; a ferroelectric layer 55 formed on the electrode layer 53; the gate electrode G formed on the ferroelectric layer 55; a semiconductor layer 57 formed on the ferroelectric layer 55; the drain electrode D formed on the semiconductor layer 57; and the source electrode S formed on the semiconductor layer 57. The gate electrode G is electrically connected to the electrode layer 53 through a contact plug 59 formed by infilling a contact hole formed through the ferroelectric layer 55. The source electrode S and the drain electrode D are disposed on the semiconductor layer 57 at a certain interval.

Next, a mechanism for recording the shock information on the ferroelectric transistor 5 having such a structure will be described. Hereinafter, the term "upward direction" means a direction from the electrode layer 53 toward the semiconductor layer 57, and the term "downward direction" means a direction from the semiconductor layer 57 toward the electrode layer 53.

When a negative voltage with respect to the source electrode S is applied to the electrode layer 53 through the gate electrode G, a downward-direction polarization is generated in a part of the ferroelectric layer 55. For this reason, the part of the semiconductor layer 57 disposed on the part of the ferroelectric layer 55 has a high resistance value. In other words, when such a negative voltage is applied, the state of the part of the semiconductor layer 57 is changed into a high-resistance state. Even after the voltage is returned to 0 volts, the part of the semiconductor layer 57 remains in the high-resistance state.

On the other hand, when a positive voltage with respect to the source electrode S is applied to the electrode layer 53 through the gate electrode G, an upward-direction polarization is generated in a part of the ferroelectric layer 55. For this reason, the part of the semiconductor layer 57 disposed on the part of the ferroelectric layer 55 has a low resistance value. In other words, when such a positive voltage is applied, the state of the part of the semiconductor layer 57 is changed into a low-resistance state. Even after the voltage is returned to 0 volts, the part of the semiconductor layer 57 remains in the low-resistance state.

The resistance value between the source electrode S and the drain electrode D is a resistance value of the domain of the semiconductor layer 57 interposed between the source electrode S and the drain electrode D. For this reason, the resistance value between the source electrode S and the drain electrode D is varied continuously depending on the degree of polarization of the ferroelectric layer 55 disposed below the domain of the semiconductor layer 57. The resistance value of the ferroelectric transistor 5 is maintained even after no voltage is applied thereto.

When an external shock is applied to the shock recording device 1, the vibration energy harvester 3 generates a voltage. If the voltage generated by the vibration energy harvester 3 is not less than the predetermined voltage Vs, the switching element 2 connects the electric power source 4 to the gate electrode G electrically. In this way, the predetermined constant voltage Vc (In FIG. 2, a constant positive voltage) supplied from the electric power source 4 is applied to the gate electrode G. Thus, the resistance value between the drain electrode D and the source electrode S is varied.

On the other hand, if the voltage generated by the vibration energy harvester 3 is less than the voltage Vs, the switching element 2 blocks the electrical connection between the electric power source 4 and the gate electrode G. In this case, no voltage is applied to the gate electrode G, and the resistance value between the drain electrode D and the source electrode S is not varied.

It is determined whether or not a shock was applied to the shock recording device 1 by detecting whether or not the resistance value between the first terminal 7 and the second terminal 8 was varied.

(Method for Fabricating the Ferroelectric Transistor)

Hereinafter, an example of the fabrication method of the ferroelectric transistor 5 will be described with reference to FIG. 3A and FIG. 3B. First, a substrate 51 such as a silicon single crystalline substrate is subjected to heat treatment at a temperature of 1,100 degrees Celsius in an oxygen atmosphere. In this way, a silicon oxide layer having a thickness of 100 nanometers is formed on the surface of the substrate 51. Next, a noble metal layer such as a platinum layer is deposited on the substrate 51 at room temperature by a sputtering method. In this way, an electrode layer 53 having a thickness of 30 nanometers is formed.

Then, while the temperature of the substrate 51 is maintained at approximately 700 degrees Celsius, a lead zirconate titanate ($Pb(Zr,Ti)O_3$, hereinafter, referred to as "PZT") layer having a thickness of 450 nanometers is deposited by a pulse laser deposition method (hereinafter, referred to as "PLD method") on the electrode layer 53. In this way, a ferroelectric layer 55 is formed.

Next, while the temperature of the substrate 51 is maintained at 400 degrees Celsius, a zinc oxide layer having a thickness of 30 nanometers is deposited on the ferroelectric layer 55. A patterned resist is formed on the zinc oxide layer. Then, the zinc oxide layer is wet-etched using nitric acid. In this way, a semiconductor layer 57 is formed on the predetermined region of the ferroelectric layer 55. After the resist is removed, a resist to be used to etch the region of the ferroelectric layer 55 where the semiconductor layer 57 is not formed is formed on the ferroelectric layer 55 and the semiconductor layer 57. The ferroelectric layer 55 is wet-etched using hydrochloric acid to form a contact hole which penetrates the ferroelectric layer 55. The electrode layer 53 is exposed at the bottom of the contact hole. Subsequently, the resist is removed.

Next, the drain electrode D and the source electrode S are formed on the semiconductor layer 57. The gate electrode G is formed on the ferroelectric layer 55 so that the contact hole is filled in. Specifically, a patterned resist is formed on the semiconductor layer 57 and the ferroelectric layer 55. Then, a titanium layer having a thickness of 5 nanometers and a platinum layer having a thickness of 30 nanometers are deposited at room temperature by an electron beam deposition method. In this way, an electrode laminate is formed. At the same time, the electrode material is deposited into the contact hole. In this way, a contact plug 59 is formed. The electrode layer 53 is electrically connected to the gate electrode G through the contact plug 59. Subsequently, the drain electrode D, the source electrode S, and the gate electrode G are formed by a lift-off method.

In this way, the ferroelectric transistor 5 used in the shock recording device 1 according to the first embodiment is formed.

(Vibration Energy Harvester 3)

Figure 4:
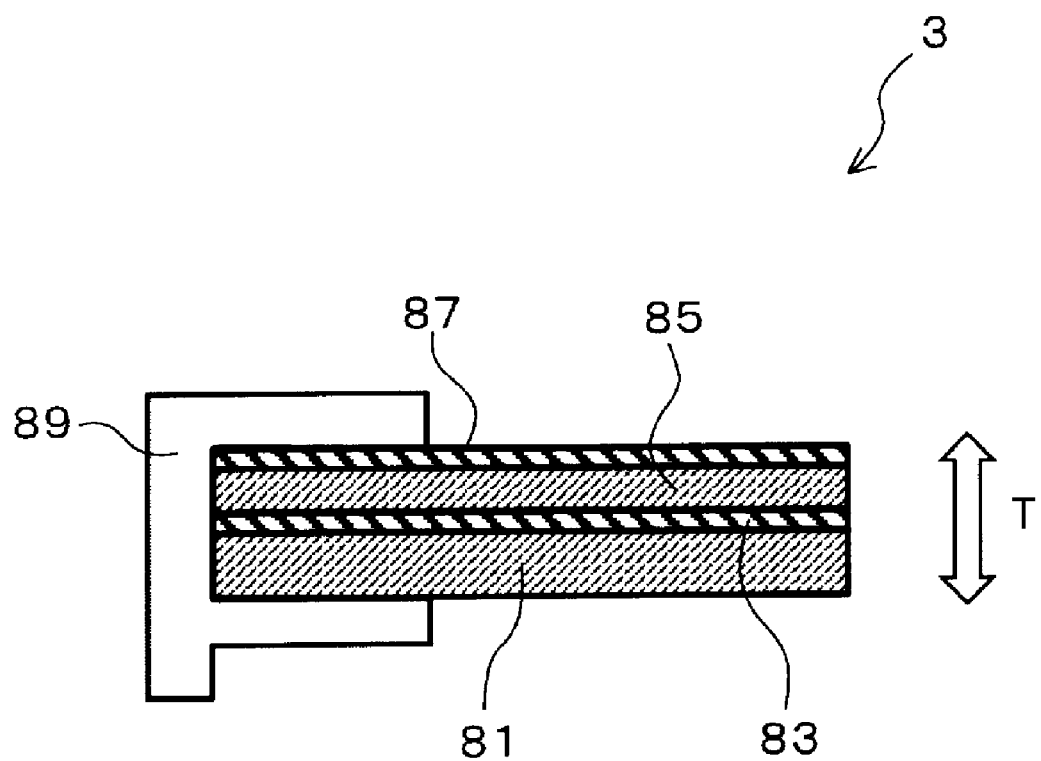
FIG. 4 shows a side view of a vibration energy harvester 3.

Hereinafter, a structure and a fabrication method of the vibration energy harvester 3 will be described with reference to FIG. 4. FIG. 4 shows a side view of the vibration energy harvester 3. As shown in FIG. 4, the vibration energy harvester 3 has a cantilever structure. Specifically, the vibration energy harvester 3 has a stacked structure comprising a substrate 81, a first electrode layer 83 formed on the substrate 81, a piezoelectric layer 85 formed on the first electrode layer 83, and a second electrode layer 87 formed on the piezoelectric layer 85. The vibration energy harvester 3 further comprises a support 89. The support 89 supports the stacked structure so as to clip one end of the stacked structure in the cross-sectional view thereof. The first electrode layer 83 functions as the first electrode 3a. The second electrode layer 87 functions as the second electrode 3b.

Next, one example of a fabrication method of the vibration energy harvester 3 will be described with reference to FIG. 4. The substrate 81 is a stainless-steel plate having a thickness of 0.5 millimeters. A platinum layer having a thickness of 0.5 micrometers is deposited on this substrate 81 by a sputtering method. In this way, the first electrode layer 83 is formed. Then, a lead zirconate titanate layer having a thickness of 3 micrometers is deposited in an oxygen atmosphere by a sputtering method. In this way, the piezoelectric layer 85 is formed. A platinum layer having a thickness of 0.5 micrometers is deposited by a sputtering method. In this way, the second electrode layer 87 is formed. One end of the thus-formed stacked structure is clipped by a support 89 made of resin. In this way, the vibration energy harvester 3 is provided.

A shock is applied along a thickness direction of the vibration energy harvester 3. Even if the shock is applied, the end supported by the support 89 does not vibrate. On the other hand, the other end that is not supported by the support 89 swings along the thickness direction of the vibration energy harvester 3 when the shock is applied thereto. The vibration energy harvester 3 converts this swing into an electric energy which is generated as a potential difference between the first electrode layer 83 and the second electrode layer 87.

Specifically, for example, the vibration energy harvester 3 has a cantilever structure having a length of 6 millimeters and a width of 3 millimeters. When the vibration energy harvester 3 is dropped from the height of 30 millimeters, a potential difference of approximately 20 volts is generated between the first electrode layer 83 and the second electrode layer 87. The potential difference may be adjusted by changing the shape of the support 89 and by changing at least one of the size and the shape of the stacked structure. The potential difference may be adjusted by adding a weight to the other end of the stacked structure that is not supported by the support 89 or by changing the load of the weight.

As long as the external shock energy is converted into a potential difference between the first electrode 3a and the second electrode 3b, the structure of the vibration energy harvester 3 is not limited to the cantilever structure. Another example of the vibration energy harvester 3 is (i) an electret used for piezoelectric power generation or (ii) an oscillator device in which a bar magnet inserted into a coil is oscillated by the shock.

(Operation of the Switching Element 2)

The voltage Vs generated by the vibration energy harvester 3 is not directly applied to the gate electrode G. The state of the switching element 2 is switched between the connection state and the disconnection state based on the voltage Vs generated by the vibration energy harvester 3. In a case where the switching element 2 is under the connection state, the constant voltage Vc supplied from the electric power source 4 is applied to the gate electrode G. Hereinafter, this will be described in more detail.

Figure 5:
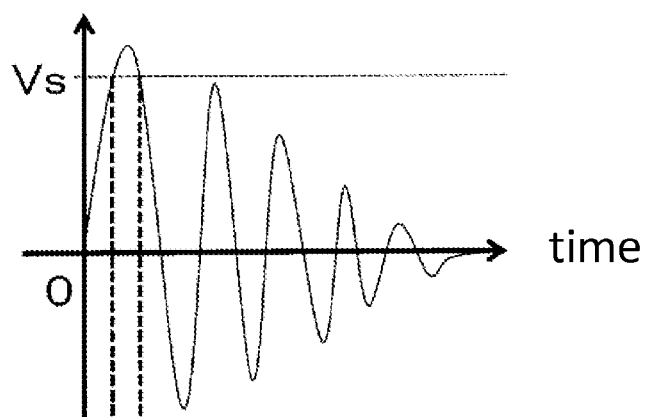
FIG. 5 shows a graph of one example of a voltage generated by the vibration energy harvester 3 and a graph of one example of a voltage applied to a gate electrode G based on the voltage.
Figure 5:
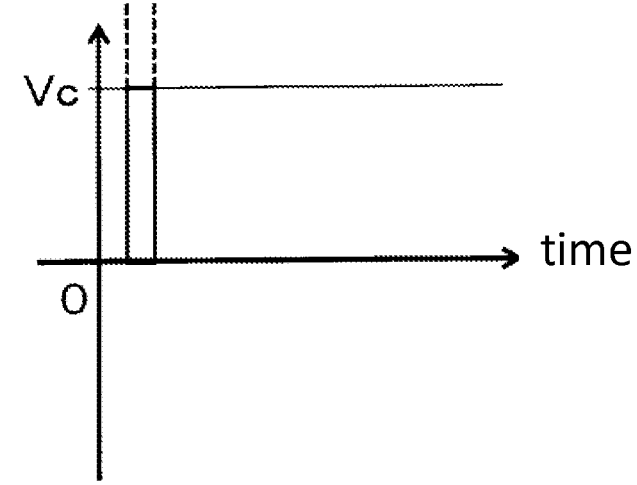

FIG. 5 shows a graph of one example of a voltage generated by the vibration energy harvester 3 and a graph of one example of a voltage applied to a gate electrode G based on the voltage.

When an external shock is applied to the vibration energy harvester 3, a voltage is generated between the terminals of the vibration energy harvester 3. As shown in the upper graph of FIG. 5, the voltage generated by the vibration energy harvester 3 behaves in a way similar to a sine wave decaying with time. In other words, the voltage generated by the vibration energy harvester 3 has a shape of a wave such that a positive voltage and a negative voltage are alternately repeated so as to decay with time.

In the shock recording device 1 according to the first embodiment, even if the voltage shown in the upper graph of FIG. 5 is generated between the terminals of the vibration energy harvester 3, the voltage is not directly applied to the nonvolatile memory 5. The voltage generated by the vibration energy harvester 3 is applied to the switching element 2. In a case where a voltage of not less than the predetermined voltage Vs is applied to the switching element 2, the electric power source 4 is electrically connected to the gate electrode G through the switching element 2.

In this way, as shown in the lower graph of FIG. 5, the voltage Vc supplied from the electric power source 4 is applied to the gate electrode G, only during the period when the vibration energy harvester 3 generates a voltage of not less than the voltage Vs. The resistance state of the ferroelectric transistor 5 is varied depending on the period when the voltage Vc supplied from the electric power source 4 is applied thereto. As just described, in the first embodiment, the constant voltage Vc which always has the same polarity is applied from the electric power source 4 to the gate electrode G, when the voltage generated by the vibration energy harvester 3 is applied to the switching element 2. For this reason, the positive voltage and the negative voltage are not applied repeatedly to the ferroelectric transistor 5. Accordingly, the presence or absence of the shock and the number of shocks are recorded in the ferroelectric transistor 5 appropriately.

With an increase in the magnitude of the external shock applied to the shock recording device 1, amplitudes shown in the upper and lower graphs of FIG. 5 are increased, and the period when the voltage is applied is also increased. For this reason, the period when the voltage Vc supplied from the electric power source 4 is applied to the gate electrode G is also increased. The change amount of the resistance value of the ferroelectric transistor 5 is also increased with an increase in this period. In other words, the change amount of the resistance value between the first terminal 7 and the second terminal 8 is also increased. The magnitude of the shock applied to the shock recording device 1 is determined based on the change amount.

An example of the electric power source 4 is a battery. As above described, the electric power supplied from the electric power source 4 is consumed only while the switching element 2 operates. For this reason, the electric power consumed in the shock recording device 1 is small. Therefore, a battery can be used as the electric power source 4.

The vibration energy harvester 3 is directly connected to the switching element 2 in the first embodiment. However, a resistance element may be provided between the vibration energy harvester 3 and the switching element 2.

Second Embodiment

Figure 6:
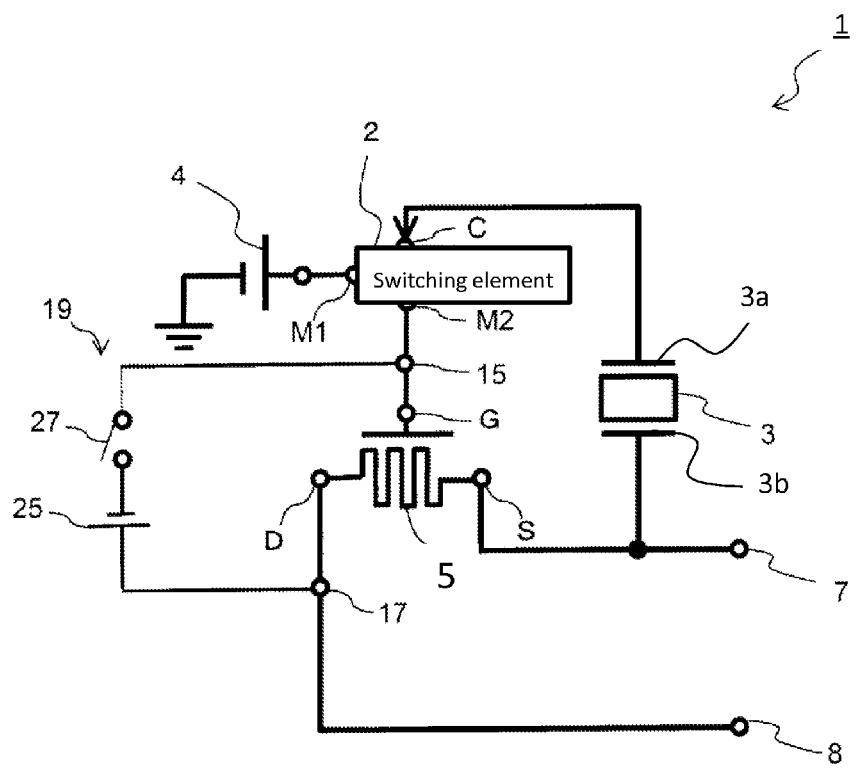
FIG. 6 shows a circuit diagram of the shock recording device 1 according to a second embodiment.

FIG. 6 shows a circuit diagram of the shock recording device 1 according to the second embodiment. The shock recording device 1 shown in FIG. 6 is similar to the shock recording device 1 shown in FIG. 2, except that a reset voltage generation circuit 19 is added.

The reset voltage generation circuit 19 comprises a DC power source 25 and a switch 27. The positive electrode of the DC power source 25 is electrically connected to the drain electrode D through a node 17. The negative electrode of the DC power source 25 is electrically connected to the gate electrode G through a node 15. The switch 27 is electrically interposed between the node 15 (or the node 17) and the DC power source 25.

When the ferroelectric transistor 5 is reset, the switch 27 is turned on. Positive and negative voltages are applied to the drain electrode D and the gate electrode G from the DC power source 25, respectively. For this reason, the semiconductor layer 57 is set to be in the high-resistance state. In this way, the state of the semiconductor layer 57 is returned to an initial state, namely, the high-resistance state. Alternatively, the positive and negative electrodes of the DC power source 25 may be electrically connected to the gate electrode G and the drain electrode D, respectively, and the semiconductor layer 57 may be set to be in the low-resistance state by the switch 27.

Third Embodiment

Figure 7:
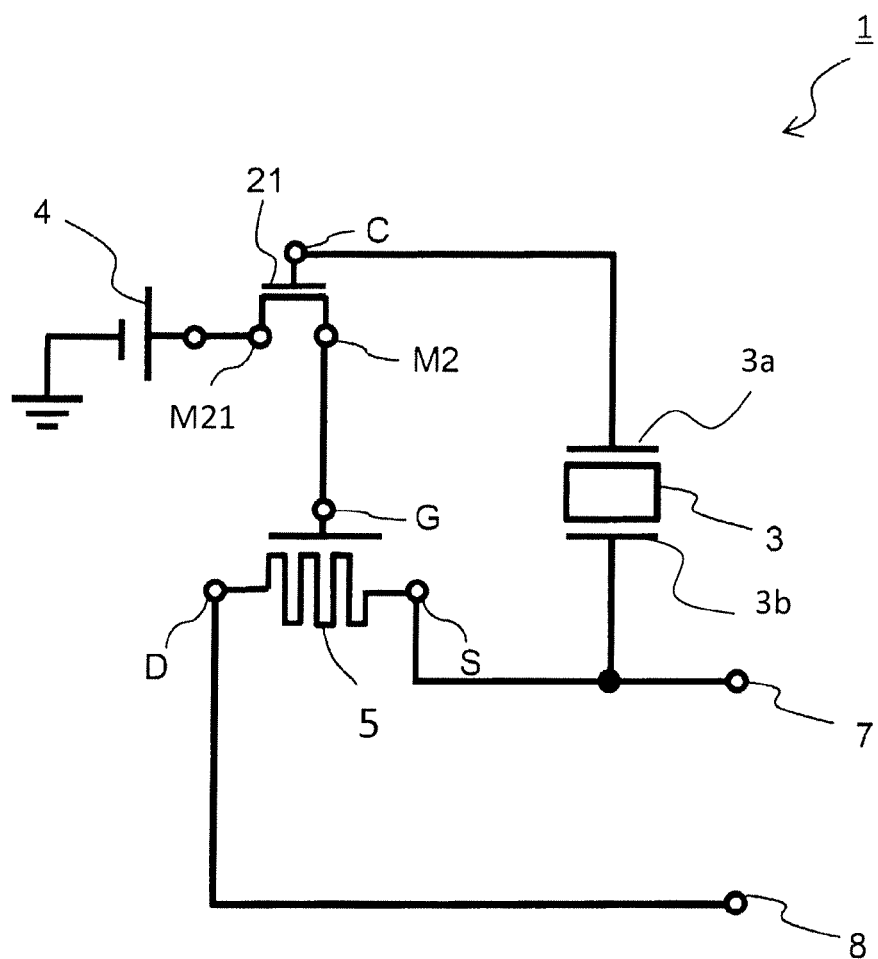
FIG. 7 shows a circuit diagram of the shock recording device 1 according to a third embodiment.

FIG. 7 shows a circuit diagram of the shock recording device 1 according to the third embodiment. In the third embodiment, the switching element 2 is a transistor 21.

Hereinafter, in the third embodiment, the transistor 21 is referred to as a second transistor 21 to distinguish the transistor 21 from the ferroelectric transistor 5. For the same reason, the ferroelectric transistor 5 is referred to as a first transistor 5 in the third embodiment. Similarly, the gate electrode, the source electrode, and the drain electrode of the second transistor 21 are referred to as a second gate electrode C, a second source electrode M21, and a second drain electrode M2, respectively, to distinguish them from the gate electrode G, the source electrode S, and the drain electrode D of the first transistor 5 (i.e., the ferroelectric transistor 5).

Figure 14:
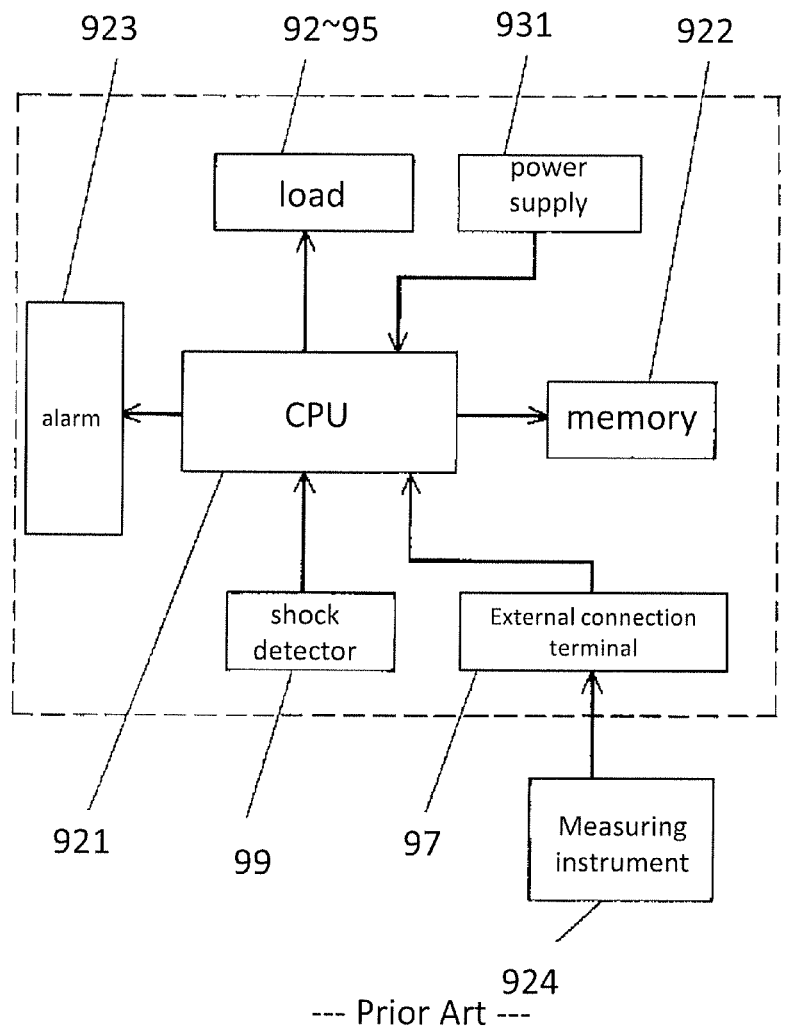
FIG. 14 shows a block diagram of the electronic apparatus disclosed in Japanese Patent Application laid-open Publication No. 2002-243754A.
Figure 15:
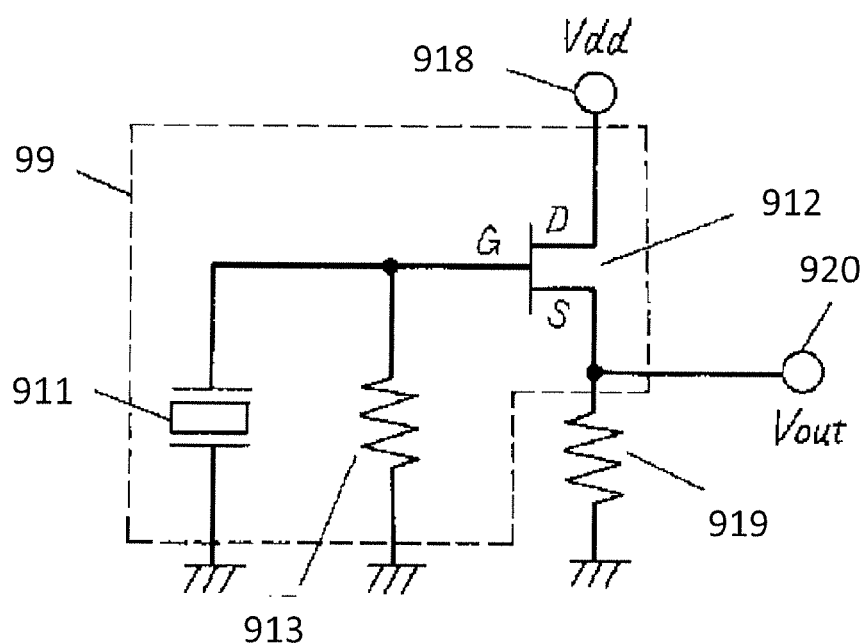
FIG. 15 shows a circuit diagram of the shock detector 99 included in the electronic apparatus disclosed in Japanese Patent Application laid-open Publication No. 2002-243754A.

As shown in FIG. 7, the shock recording device 1 according to the third embodiment consists of the electric power source 4, the vibration energy harvester 3, the first transistor 5, and the second transistor 21. The verb "consist of" means "not through the CPU 921 shown in FIG. 14". In other words, the shock recording device 1 according to the third embodiment is composed of four elements of the electric power source 4, the vibration energy harvester 3, the first transistor 5, and the second transistor 21. As just described, the shock recording device 1 according to the third embodiment has a significantly simple structure. In other words, the third embodiment provides a significantly simply-structured shock recording device 1 which does not comprise an electronic apparatus having a complicated structure such as a CPU.

The second gate electrode C is electrically connected to the first electrode 3a. The second drain electrode M1 is electrically connected to the electric power source 4. The second source electrode M2 is electrically connected to the first gate electrode G. The second source electrode M21 is electrically connected to the second electrode 3b.

The reset voltage generation circuit 19 described in the second embodiment may be added to the shock recording device 1 according to the third embodiment.

Fourth Embodiment

Figure 8:
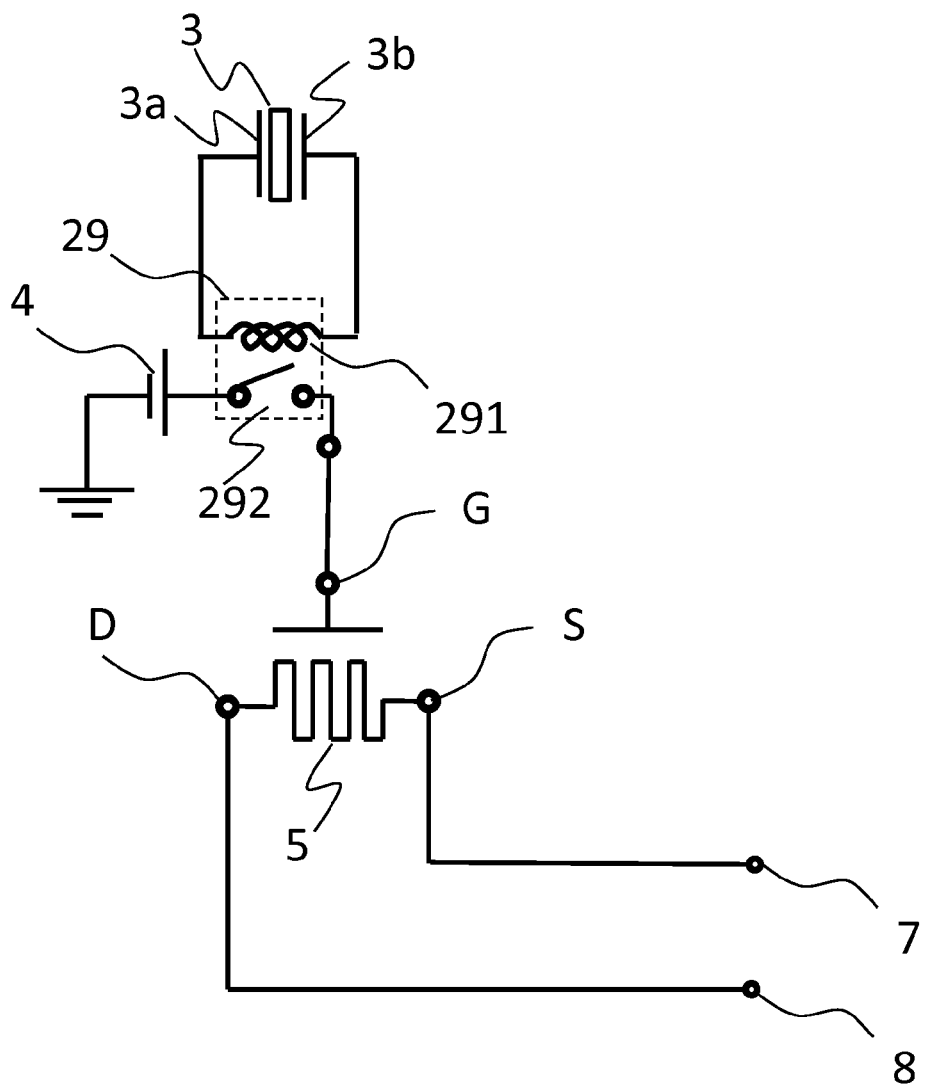
FIG. 8 shows a circuit diagram of the shock recording device 1 according to a fourth embodiment.

FIG. 8 shows a circuit diagram of the shock recording device 1 according to the fourth embodiment. In the fourth embodiment, the switching element 2 is a relay element 29. As shown in FIG. 8, the shock recording device 1 according to the fourth embodiment consists of the electric power source 4, the vibration energy harvester 3, the relay element 29, and the ferroelectric transistor 5. Similarly to the case of the third embodiment, the verb "consist of" means "not through the CPU 921 shown in FIG. 14". In other words, the shock recording device 1 according to the fourth embodiment is composed of four elements of the electric power source 4, the vibration energy harvester 3, the relay element 29, and the ferroelectric transistor 5. As just described, the shock recording device 1 according to the fourth embodiment has a significantly simple structure. In other words, similarly to the third embodiment, the fourth embodiment provides a significantly simply-structured shock recording device 1 which does not comprise an electronic apparatus having a complicated structure such as a CPU.

The relay element 29 is composed of a coil 291 and a switch 292. The coil 291 is electrically connected to the vibration energy harvester 3. The switch 292 is electrically interposed between the electric power source 4 and the gate electrode G. In more detail, one end of the coil 291 is electrically connected to the first electrode 3a. The other end of the coil 291 is electrically connected to the second electrode 3b. One end of the switch 292 is electrically connected to the electric power source 4. The other end of the switch 292 is electrically connected to the gate electrode G.

The reset voltage generation circuit 19 described in the second embodiment may be added to the shock recording device 1 according to the fourth embodiment.

Fifth Embodiment

Figure 9:
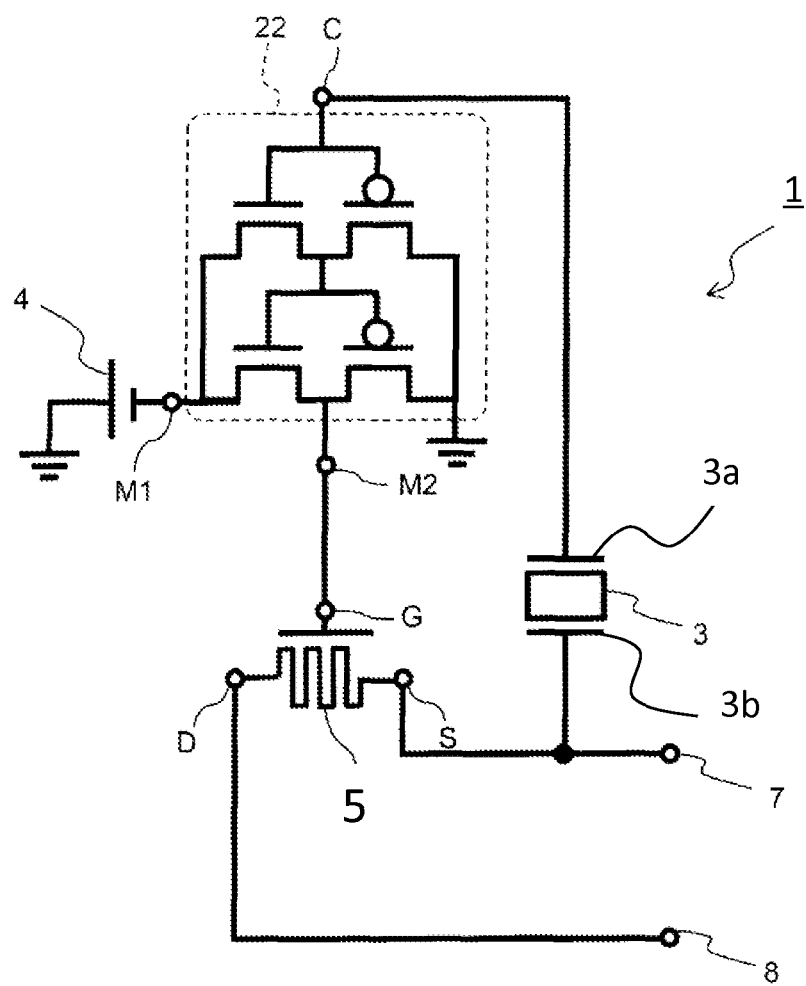
FIG. 9 shows a circuit diagram of the shock recording device 1 according to a fifth embodiment.

FIG. 9 shows a circuit diagram of the shock recording device 1 according to the fifth embodiment. In the fifth embodiment, the transistor 21 is composed of a CMOS inverter 22. The CMOS inverter 22 has a gate structure in which at least one pMOS transistor and at least one nMOS transistor are disposed complementarily. In FIG. 9, the CMOS inverter 22 has a two-gate structure in which two pMOS transistors and two nMOS transistors are disposed complementarily.

When a voltage of not more than a predetermined negative voltage (e.g., −5 V) is applied to the CMOS inverter 22, the electric power source 4 and the ferroelectric transistor 5 are electrically connected to each other through the CMOS inverter 22. On the other hand, when a voltage more than the predetermined negative voltage is applied to the CMOS inverter 22, the electric power source 4 is electrically insulated from the ferroelectric transistor 5. The electric power source 4 is configured so that a negative voltage is applied to the gate electrode G of the ferroelectric transistor 5.

When the CMOS inverter 22 is used as the switching element 2, the electric power source 4 can be surely connected to or disconnected from the ferroelectric transistor 5 electrically. By using the switching element 2 such as the CMOS inverter 22, the shock recording device 1 operable with a small electric power is achieved, since a current flows from the electric power source 4 to the gate electrode G only while the switching element 2 operates. Needless to say, the shock recording device 1 according to the fifth embodiment has the same technical effect as that of the third embodiment.

(Specific Embodiment of the CMOS Inverter 22)

Figure 10:
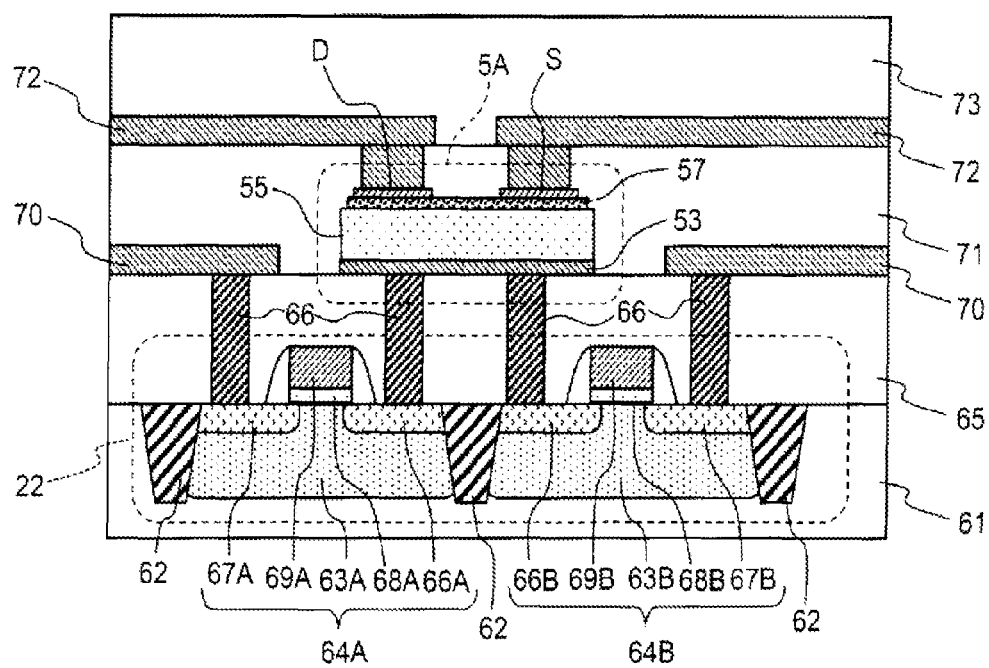
FIG. 10 shows a cross-sectional view of a CMOS inverter 22 and the ferroelectric transistor 5 in the fifth embodiment.

Hereinafter, a specific embodiment of the CMOS inverter 22 will be described. FIG. 10 shows a cross-sectional view of the CMOS inverter 22 and the ferroelectric transistor 5. FIG. 10 shows only the two MOS transistors of the four transistors included in the CMOS inverter 22.

The CMOS inverter 22 includes at least one pMOS transistor 64A and at least one nMOS transistor 64B. The pMOS transistor 64A and the nMOS transistor 64B are formed on a substrate 61. The surface of the substrate 61 has a plurality of element-formation domains 63A, 63B. The two element-formation domains 63A, 63B adjacent to each other are separated from each other so as to interpose an element-isolation domain 62 therebetween. The pMOS transistor 64A comprises a first p-type diffusion domain 66A, a second p-type diffusion domain 67A, a gate insulation film 68A, and a gate electrode 69A. The nMOS transistor 64B comprises a first n-type diffusion domain 66B, a second n-type diffusion domain 67B, a gate insulation film 68B, and a gate electrode 69B.

An insulation layer 65 is formed on the substrate 61 so as to cover the pMOS transistor 64A and the nMOS transistor 64B. The ferroelectric transistor 5 is formed on the insulation layer 65. The ferroelectric transistor 5 comprises an electrode layer 53, a ferroelectric layer 55, a semiconductor layer 57, the source electrode S and the drain electrode D. The electrode layer 53 functions as the gate electrode G. The ferroelectric layer 55 is interposed between the electrode layer 53 and the semiconductor layer 57. The source electrode S and the drain electrode D are formed on the semiconductor layer 57.

The electrode layer 53 is electrically connected to the first p-type diffusion domain 66A and the first n-type diffusion domain 66B through a contact plug 66. The contact plug 66 is formed by infilling a contact hole formed through the insulation layer 65 with a metal material. The ferroelectric transistor 5 and the CMOS inverter 22 are formed using a conventional semiconductor process.

Hereinafter, a method for fabricating the CMOS inverter 22 and the ferroelectric transistor 5A shown in FIG. 10 will be described more specifically.

First, a substrate 61 formed of silicon single crystal is prepared. A plurality of element-isolation domains 62 are formed on the surface of the substrate 61 by a shallow trench isolation method (hereinafter, referred to as "STI method"). In this way, a plurality of element-formation domains 63A, 63B are formed. Each of the element-formation domains is formed between two adjacent element-isolation domains 62. Each element-formation domain 63A is doped with an n-type dopant. Each element-formation domain 63B is doped with a p-type dopant.

Next, gate insulation films 68A, 68B formed of silicon oxide are formed on the surface of the element-formation domains 63A, 63B, respectively. Gate electrodes 69A, 69B are formed on the gate insulation films 68A, 68B, respectively.

Each of the element-formation domains 63A is doped with a p-type dopant from above the gate electrode 69A to form a first p-type diffusion domain 66A and a second p-type diffusion domain 67A. Similarly, each of the element-formation domains 63B is doped with an n-type dopant from above the gate electrode 69B to form a first n-type diffusion domain 66B and a second n-type diffusion domain 67B. In this way, the CMOS inverter 22 is formed.

Then, an insulation layer 65 formed of silicon oxide is formed so as to cover the CMOS inverter 22 and the substrate 61. A contact hole which penetrates the insulation layer 65 is formed by a photolithography method and an anisotropic etching method (hereinafter, referred to as "RIE method") of a resist film. A conductive material such as tungsten is filled in the contact hole to provide a contact plug 66.

The upper surfaces of the insulation layer 65 and the contact plug 66 are polished by a chemical mechanical polishing method (hereinafter, referred to as "CMP method").

Subsequently, an electrode layer 53 is formed. Specifically, a titanium film having a thickness of 5 nanometers and a platinum film having a thickness of 30 nanometers are deposited by a sputtering method. Then, the surface of the platinum film is polished. Furthermore, a conductive film including $SrRuO_3$ is deposited by a PLD method. It is desirable that the conductive film has a thickness of 10 nanometers. It is desirable that the temperature of the substrate 61 in the PLD method is 700 degrees Celsius.

Similarly to the case of the first embodiment, a ferroelectric layer 55, a semiconductor layer 57, a drain electrode D, and a source electrode S are formed.

Furthermore, an electrode layer 70 is formed. The electrode layer 70 is electrically connected to the second p-type diffusion domain 67A or the second n-type diffusion domain 67B through a part of the contact plugs 66. The electrode layer 70 is formed of, for example, aluminum. The electrode layer 53 is electrically connected to the first p-type diffusion domain 66A or the first n-type diffusion domain 66B through other contact plugs 66.

An insulation layer 71 formed of silicon oxide is formed so as to cover the insulation layer 65, the electrode layer 70, and the ferroelectric transistor 5. contact plugs are formed so as to penetrate the insulation layer 71. An electrode layer 72 is formed on the insulation layer 71 so as to be electrically connected to the drain electrode D and the source electrode S through the contact plugs. The electrode layer 72 is formed of, for example, aluminum. Finally, a surface protective layer 73 is formed on the insulation layer 71 and the electrode layer 72.

As just described, in the fifth embodiment, the CMOS inverter 22 and the ferroelectric transistor 5 are stacked on the one substrate 61. In this way, the number of the elements which constitute the shock recording device 1 is lowered. It is not necessary to separately provide an electrode which is used to electrically connect the CMOS inverter 22 to the ferroelectric transistor 5. For this reason, the strength against the shock rises and the reliability of the shock recording device 1 also rises. In addition, the production cost of the shock recording device 1 is lowered.

In the fifth embodiment, the CMOS inverter 22 and the ferroelectric transistor 5 are formed on the one substrate 61. Alternatively, the substrate on which the CMOS inverter 22 is formed may be different from the substrate on which the ferroelectric transistor 5 is formed.

Sixth Embodiment

Figure 11:
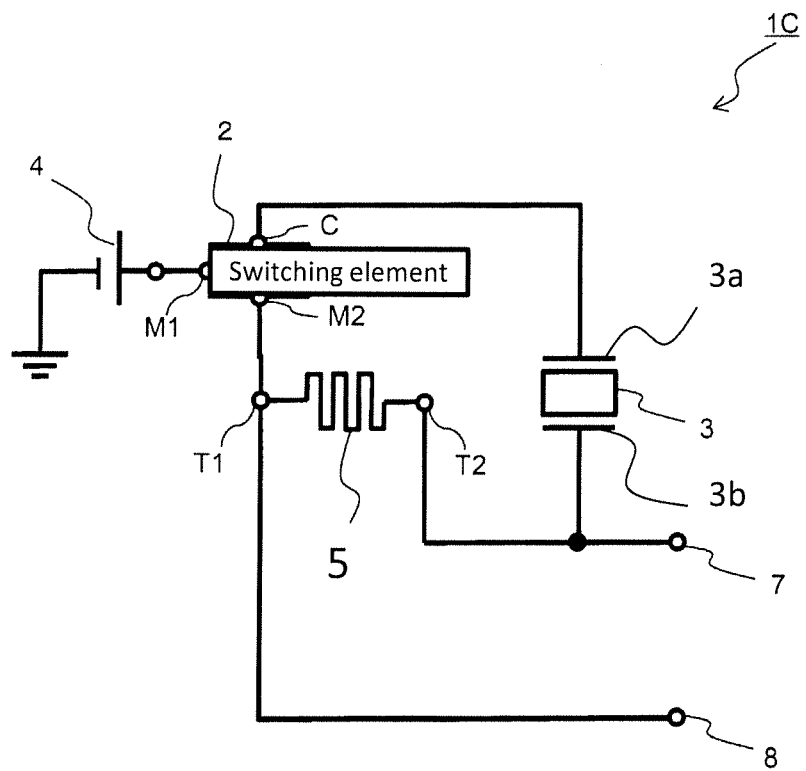
FIG. 11 shows a circuit diagram of the shock recording device 1 according to a sixth embodiment.

FIG. 11 shows a circuit diagram of the shock recording device 1 according to the sixth embodiment. In the sixth embodiment, the nonvolatile memory 5 is a two-terminal nonvolatile memory element having a pair of main electrodes. The nonvolatile memory 5 comprises a first terminal T1 and a second terminal T2.

Specifically, as shown in FIG. 11, the main electrode M1 is electrically connected to the electric power source 4. The main electrode M2 is electrically connected to the first terminal T1. The control electrode C is electrically connected to the first electrode 3a. The second terminal T2 is electrically connected to the second electrode 3b.

The resistance value of the two-terminal nonvolatile memory element (i.e., the resistance value between the first terminal T1 and the second terminal T2) is varied depending on the magnitude and the period of the voltage applied between the first terminal T1 and the second terminal T2. An example of such a two-terminal nonvolatile memory element is a resistance random access memory, a phase-change memory, or a magnetic memory. Also in the sixth embodiment, the resistance value between the first terminal 7 and the second terminal 8 is measured in order to detect the presence or absence of the shock.

In the sixth embodiment, the switching element 2 may be a transistor 21, a relay element 29, or a CMOS inverter 22.

EXAMPLE

Hereinafter, the present invention will be described in more detail with reference to the following example.

Inventive Example 1

In the inventive example 1, the shock recording device 1 having the electric circuit shown in FIG. 9 was fabricated.

(Fabrication of the Vibration Energy Harvester 3)

First, a method for fabricating the vibration energy harvester 3 is described below.

A substrate 81 having a size of 2 millimeters×7 millimeters was obtained by a laser processing method from a stainless-steel plate having a thickness of 0.1 millimeter.

While the substrate 81 was maintained at 400 degrees Celsius, a platinum layer was formed on the substrate 81 by a sputtering method in an argon atmosphere. In this way, a first electrode layer 83 having a thickness of 500 nanometers was formed.

While the substrate 81 was maintained at 600 degrees Celsius, a piezoelectric layer 85 formed of PZT was formed by a sputtering method in an oxygen atmosphere. In this way, the piezoelectric layer 85 having a thickness of 3 micrometers was formed.

Another platinum layer was formed on the substrate 81 by a sputtering method in an argon atmosphere at room temperature. In this way, a second electrode layer 87 having a thickness of 100 nanometers was formed to give a stacked structure of the substrate 81/the first electrode layer 83/the piezoelectric layer 85/the second electrode layer 87.

A support 89 formed of resin was fixed to one end of the stacked structure. A weight of 30 milligrams was fixed to the other end of the stacked structure. In this way, a vibration energy harvester 3 having a shape of a cantilever was provided.

When a shock was applied to this vibration energy harvester 3, an alternate current having a frequency of 250 Hz was output through the first electrode layer 83 and the second electrode layer 87.

(Fabrication of the Ferroelectric Transistor 5)

Next, a method for fabricating the ferroelectric transistor 5 will be described below.

First, a substrate formed of silicon single crystal was exposed to an oxygen atmosphere at a temperature of 1,100 degrees Celsius. In this way, a silicon oxide layer having a thickness of 100 nanometers was formed on the surface of the silicon single crystalline substrate.

Then, while the substrate was heated to 400 degrees Celsius, platinum was deposited on the substrate by a sputtering method. In this way, an electrode layer 53 formed of platinum was formed. The electrode layer 53 had a thickness of 30 nanometers.

While the substrate was heated to 700 degrees Celsius, a layer of lead zirconate titanate (PZT) represented by the chemical formula $Pb(Zr,Ti)O_3$ was formed by a pulse laser deposition method (hereinafter, referred to as "PLD method") on the electrode layer 53. In this way, a ferroelectric layer 55 formed of PZT was formed. The ferroelectric layer 55 had a thickness of 450 nanometers.

While the substrate was heated to 400 degrees Celsius, a layer of zinc oxide represented by the chemical formula ZnO was formed on the ferroelectric layer 55. In this way, the zinc oxide layer was formed. The zinc oxide layer had a thickness of 30 nanometers. Furthermore, the zinc oxide layer was patterned using nitric acid. In this way, a semiconductor layer 57 formed of zinc oxide was formed.

By patterning the ferroelectric layer 55 using hydrochloric acid, the contact hole which penetrates the ferroelectric layer 55 was formed. The electrode layer 53 was exposed on the bottom of the contact hole.

A stacked structure including a titanium film having a thickness of 5 nanometers and a platinum film having a thickness of 30 nanometers was deposited on the semiconductor layer 57. The source electrode S and the drain electrode D were formed by patterning the stacked structure.

The stacked structure was deposited onto the inside of the contact hole to give a contact plug 59 formed of titanium and platinum. In this way, the ferroelectric transistor 5 was provided. The ferroelectric transistor 5 had a size of 2 millimeters×2 millimeters when viewed in the top view.

The gate width W and the gate length L shown in FIG. 3B were equal to 100 micrometers and 3 micrometers, respectively, in the inventive example 1.

Finally, the vibration energy harvester 3 and the ferroelectric transistor 5 were disposed on a circuit substrate (not illustrated) on which the CMOS inverter 22 was formed to provide the shock recording device 1 according to the inventive example 1. A battery of −5 volts was used as the electric power source 4. The ON voltage of the CMOS inverter 22 was −5 volts. In other words, when a voltage not more than −5 volts (e.g., −6 volts) was applied to the gate electrode C of the CMOS inverter 22, the CMOS inverter 22 was turned on. On the other hand, when a voltage morethan −5 volts (e.g. −3 volts, including 0 volts) was applied to the gate electrode C of the CMOS inverter 22, the CMOS inverter 22 was turned off.

Before the shock recording device 1 according to the inventive example 1 was used, a voltage of +5 volts with respect to the source electrode S was applied to the gate electrode G. In this way, the shock recording device 1 was reset. After the reset, the resistance value between the first terminal 7 and the second terminal 8 was $2.68 \times 10^4$ ohms. In other words, the reset operation caused the semiconductor layer 57 to be under a low resistance state.

(Application of Shock)

Next, the shock recording device 1 according to the inventive example 1 was dropped from the height of 10 millimeters. In this way, a shock was applied to the shock recording device 1 according to the inventive example 1. Before and after the dropping, the resistance value of the semiconductor layer 57 was measured through the first terminal 7 and the second terminal 8 by an ammeter. The following Table 1 shows the results.

TABLE 1

| State | Resistance value |
|---|---|
| Before the shock was applied | $2.68 \times 10^4$ ohms |
| After the shock was applied | $5.02 \times 10^7$ ohms |

As is clear from Table 1, the resistance value after the shock was applied is significantly larger than the resistance value before the shock was applied. Therefore, it is possible to determine whether or not the shock was applied to the shock recording device 1 based on the resistance value of the semiconductor layer 57.

Figure 12A:
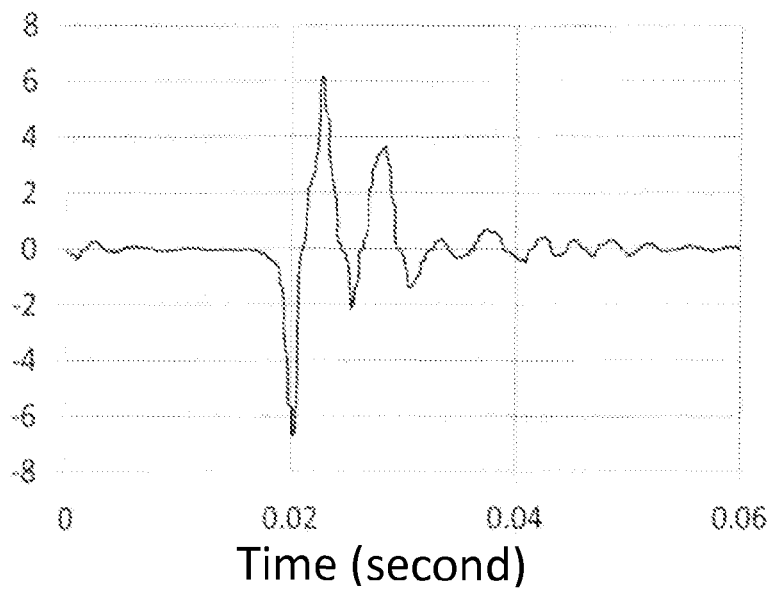
FIG. 12A is a graph indicating a relation between the time and the voltage generated by the vibration energy harvester 3 in an inventive example 1.
Figure 12B:
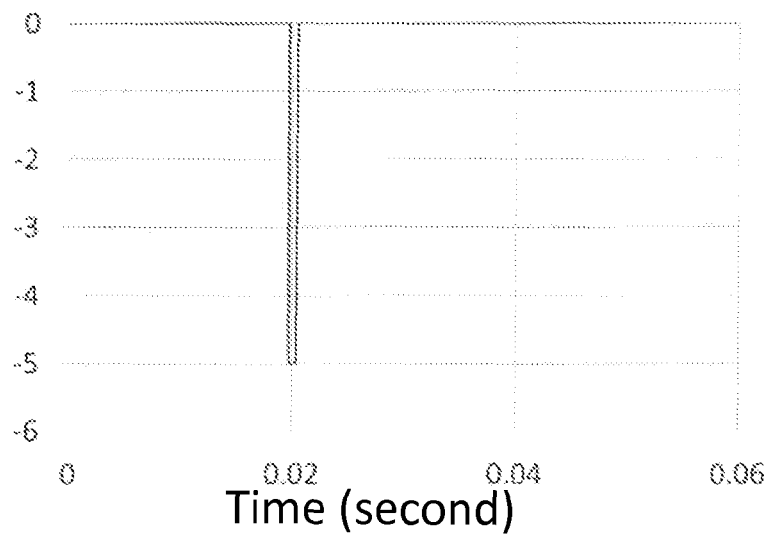
FIG. 12B is a graph indicating a relation between the time and the voltage applied to the gate electrode G of the ferroelectric transistor 5 in the inventive example 1.

FIG. 12A is a graph indicating a relation between the time and the voltage generated by the vibration energy harvester 3 in the inventive example 1. FIG. 12B is a graph indicating a relation between the time and the voltage applied to the gate electrode G of the ferroelectric transistor 5 in the inventive example 1. Since the vibration energy harvester 3 has a shape of a cantilever, the vibration energy harvester 3 vibrates in a vertical direction by the action of the shock. As a result, as shown in FIG. 12A, the voltage generated by the vibration energy harvester 3 vibrates positively and negatively. On the other hand, as shown in FIG. 12B, only when a voltage of not more than −5 volts (e.g., −6 volts) is generated by the vibration energy harvester 3, the voltage of −5 volts supplied from the electric power source 4 is applied to the gate electrode G.

Figure 13:
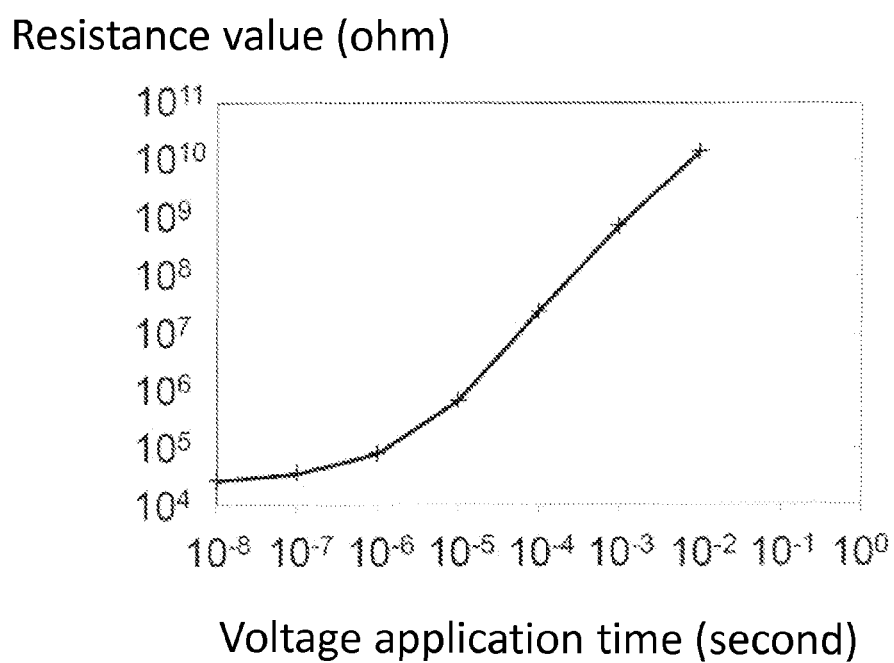
FIG. 13 is a graph indicating a relation between the time for which a voltage was applied to the gate electrode G and the resistance value of the ferroelectric transistor 5 (namely, the resistance value of a semiconductor layer 57).

FIG. 13 is a graph indicating a relation between the time for which a voltage was applied to the gate electrode G and the resistance value of the ferroelectric transistor 5 (namely, the resistance value of the semiconductor layer 57). As is clear from FIG. 13, the resistance value is increased with an increase in the period when the voltage is applied to the gate electrode G. Since it is obvious that the period when the voltage is applied to the gate electrode G is longer with an increase in the magnitude of the shock, the shock recording device 1 according to the inventive example 1 records the magnitude of the shock. In other words, the resistance value is increased with an increase in the magnitude of the shock.

INDUSTRIAL APPLICABILITY

The shock recording device 1 according to the present invention can be incorporated in an electronic device such as a mobile phone, a smartphone, or a tablet. When the electronic device is out of order, it is determined whether or not a shock was applied to the electronic device by measuring the resistance value of the semiconductor layer included in the shock recording device 1. Specifically, a user of the electronic device hands over the electric device to a determiner. Then, the determiner measures a value of the semiconductor layer through the drain electrode and the source electrode. Finally, the determiner determines whether or not a shock has been applied to the shock recording device included in the electronic device.

REFERENCE SIGNS LIST

1 shock recording device
2 switching element
   C control electrode
   M1 first main electrode
   M2 second main electrode
21 transistor
22 CMOS inverter
3 vibration energy harvester
   3a first electrode
   3b second electrode
4 electric power source
5 nonvolatile memory
   D drain electrode
   S source electrode
   G gate electrode
7 first terminal
8 second terminal
15, 17 node
19 reset voltage generation circuit
25 DC power source
27 switch
29 relay element
   291 coil
   292 switch
51, 61, 81 substrate
53, 70, 72 electrode layer
55 ferroelectric layer
57 semiconductor layer
59, 66 contact plug
62 element-isolation domain
63A, 63B element-formation domain
64A, 64B MOS transistor
65, 71 insulation layer
66A, 67A, 66B, 67B diffusion domain
68A, 68B gate insulation film
69A, 69B gate electrode
73 surface protective layer
83 first electrode layer
85 piezoelectric layer
87 second electrode layer
89 support

The invention claimed is:

1. A shock recording device consisting of:
an electric power source;
a vibration energy harvester comprising a first electrode and a second electrode, the vibration energy harvester converting an energy of a shock applied thereto into a potential difference between the first electrode and the second electrode;
a first transistor comprising a first gate electrode, a first source electrode, and a first drain electrode, the first transistor further comprising a stacked structure of a ferroelectric layer and a semiconductor layer, the semiconductor layer being connected to the first source electrode and the first drain electrode, and disposed on the ferroelectric layer; and
a second transistor comprising a second gate electrode, a second source electrode, and a second drain electrode, wherein:
the second gate electrode is electrically connected to the first electrode of the vibration energy harvester;
the second drain electrode is electrically connected to the electric power source;
the second source electrode is electrically connected to the first gate electrode; and
the first source electrode is electrically connected to the second electrode of the vibration energy harvester.

2. The shock recording device according to claim 1, wherein
the second transistor is a CMOS inverter.

3. A method comprising:
(a) preparing the shock recording device according to claim 1;
(b) measuring a resistance value between the first drain electrode and the first source electrode as a resistance value of the semiconductor layer; and
(c) determining whether or not a shock was applied to the shock recording device based on the resistance value.

4. The method according to claim 3, wherein
a magnitude of the shock applied to the shock recording device is also determined based on the resistance value of the semiconductor layer in the step (c).

5. The method according to claim 3, further comprising:
(z1) connecting a reset voltage generation circuit comprising a DC power source and a switch in series to the shock recording device so that one end of the DC power source and one end of the switch are electrically connected to the first drain electrode and the first gate electrode, respectively; and
(z2) turning on the switch to apply a voltage difference between the first drain electrode and the first gate electrode;
wherein the steps (z1) and (z2) are conducted before the step (a).

6. A shock recording device comprising:
an electric power source;
a vibration energy harvester comprising a first electrode and a second electrode, the vibration energy harvester converting an energy of a shock applied thereto into a potential difference between the first electrode and the second electrode;
a first transistor comprising a first gate electrode, a first source electrode, and a first drain electrode, the first transistor further comprising a stacked structure of a ferroelectric layer and a semiconductor layer, the semiconductor layer being connected to the first source electrode and the first drain electrode, and disposed on the ferroelectric layer; and a CMOS inverter comprising a first power supply terminal, a second power supply terminal, an input terminal and an output terminal, wherein:

the input terminal is electrically connected to the first electrode of the vibration energy harvester;

the first power supply terminal is electrically connected to the electric power source;

the output terminal is electrically connected to the first gate electrode; and the first source electrode is electrically connected to the second electrode of the vibration energy harvester.

\* \* \* \* \*